Figure 1:
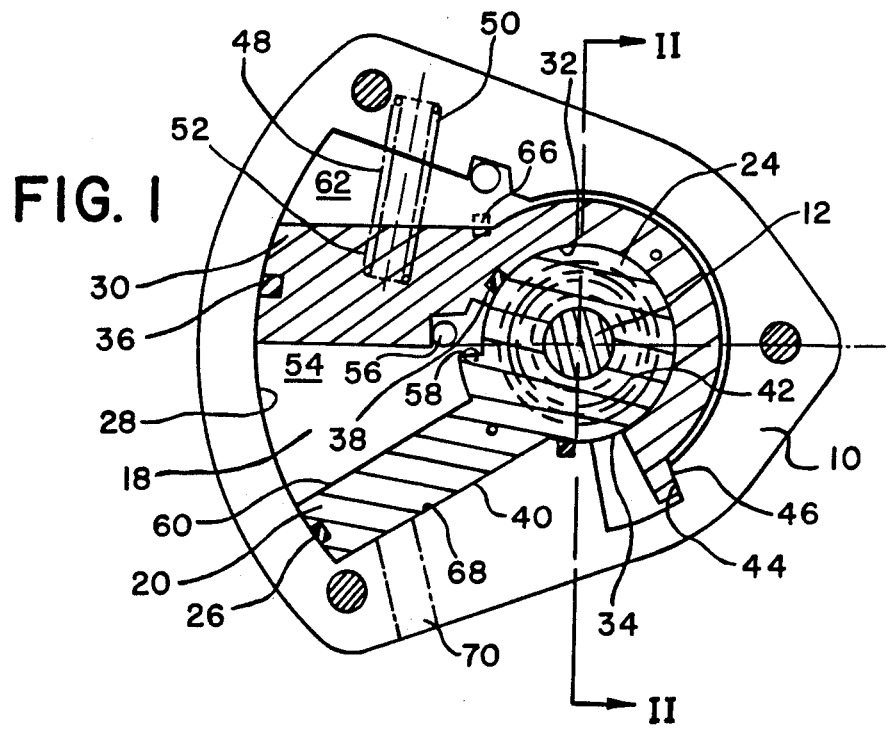

United States Patent [19]

Bacardit

[11] Patent Number: 4,965,999
[45] Date of Patent: Oct. 30, 1990

[54] TANDEM ROTARY MASTER CYLINDER

[75] Inventor: Juan S. Bacardit, Barcelona, Spain

[73] Assignee: Bendix Espana, Barcelona, Spain

[21] Appl. No.: 402,949

[22] Filed: Sep. 5, 1989

[51] Int. Cl.$^5$ .................... B60T 13/16; B60T 11/20; F01C 9/00

[52] U.S. Cl. .................... 60/547.1; 60/562; 60/588; 91/375 R; 92/122; 92/123

[58] Field of Search .................... 60/547.1, 562, 588, 60/593; 91/375 R; 92/122, 123

[56] References Cited

U.S. PATENT DOCUMENTS

| | | | |
|---|---|---|---|
| 976,907 | 11/1910 | Pagendarm | 60/581 X |
| 1,577,579 | 3/1926 | Hirschler | 60/592 X |
| 4,192,224 | 3/1980 | Okamura | 92/125 |

Primary Examiner—Edward K. Look
Assistant Examiner—George Kapsalas
Attorney, Agent, or Firm—Larry J. Palguta; Ken C. Decker

[57] ABSTRACT

The present invention relates to a tandem rotary master-cylinder for a vehicle brake circuit comprising a body (10;102) in which a first vane (20;114) is mounted for rotation in response to rotation of an input shaft (12;100) in order to generate pressure in a first working chamber (18;126) formed in the body (10;102) and delimited in part by the first vane (20;114).

According to the invention the master-cylinder further comprises a second vane (30;120) rotatably mounted in the body (10;102) and delimiting with the first vane (20;114) the first working chamber (18;126) the second vane being rotatable in response to rotation of the first vane (20;114) to generate pressure in a second working chamber (62;128).

A rotary master-cylinder with braking assistance is also described.

10 Claims, 4 Drawing Sheets

TANDEM ROTARY MASTER CYLINDER

The present invention relates to a tandem rotary master-cylinder and more particularly to such a master-cylinder intended for use in the braking circuit of an automotive vehicle. In a second embodiment, the present invention relates to a tandem rotary master-cylinder having braking assistance provided by a source of fluid under pressure.

An example of a previously proposed rotary master-cylinder is given in the document U.S. Pat. No. 4,192,224. In this device actuation of the brake pedal caused rotation of a piston in a bore, the piston having a curved profile which engaged a slideable dam which delimited a pressure chamber having a variable volume. This document only referred to single master-cylinder.

With modern vehicles having dual braking circuits it is necessary to have a tandem master-cylinder, i.e. one having two pressure chambers. It is, therefore, an object of the present invention to provide a tandem rotary master-cylinder which is of simple construction, is compact and is reliable.

According to the invention there is provided a rotary master-cylinder comprising a body in which a first vane is mounted for rotation in response to rotation of an input shaft in order to generate pressure in a first working chamber formed in the body and delimited in part by the first vane characterized in that the master-cylinder further comprises a second vane rotatably mounted in the body and delimiting with the first vane the first working chamber, the second vane being rotatable in response to rotation of the first vane to generate pressure in a second working chamber.

It is a further object of the invention to provided an assisted tandem rotary master-cylinder.

According to a second embodiment of the invention there is provided a rotary master-cylinder further comprising valve means adapted to be disposed between a source of fluid under pressure and an actuator chamber formed in the body and delimited in part by the first vane, the valve means being operable in response to rotation of the input shaft so as to send fluid under pressure into the actuator chamber and cause displacement of the first vane.

Figure 2:
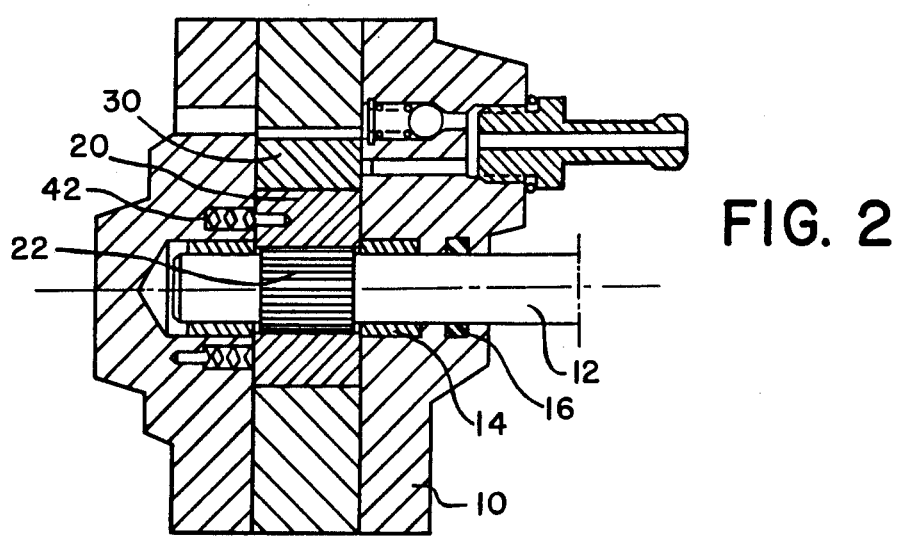
Figure 3:
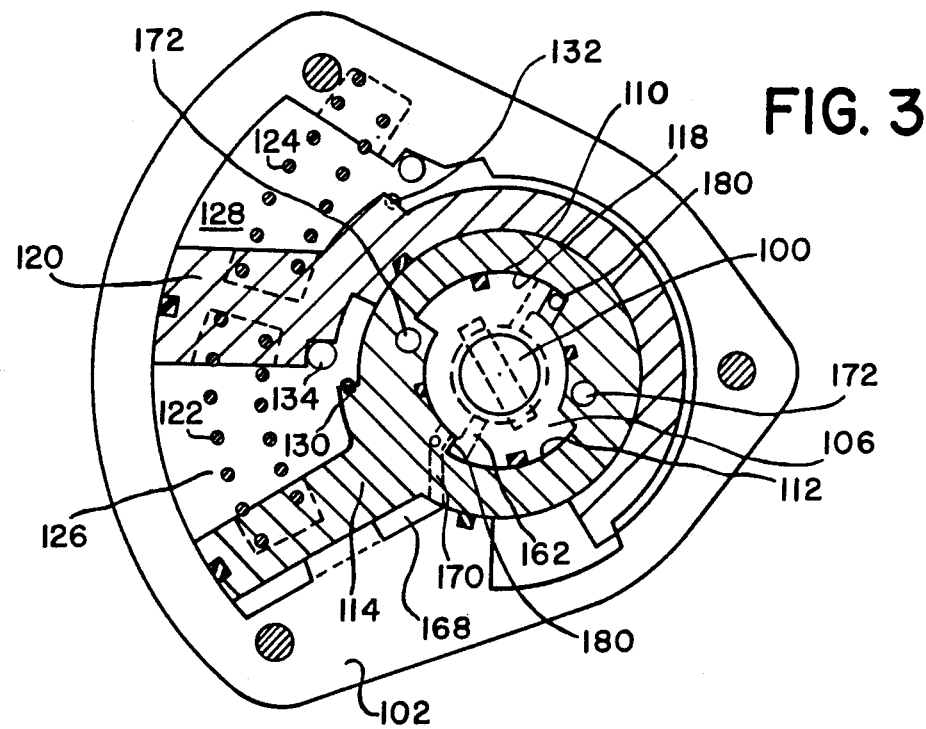
Figure 4:
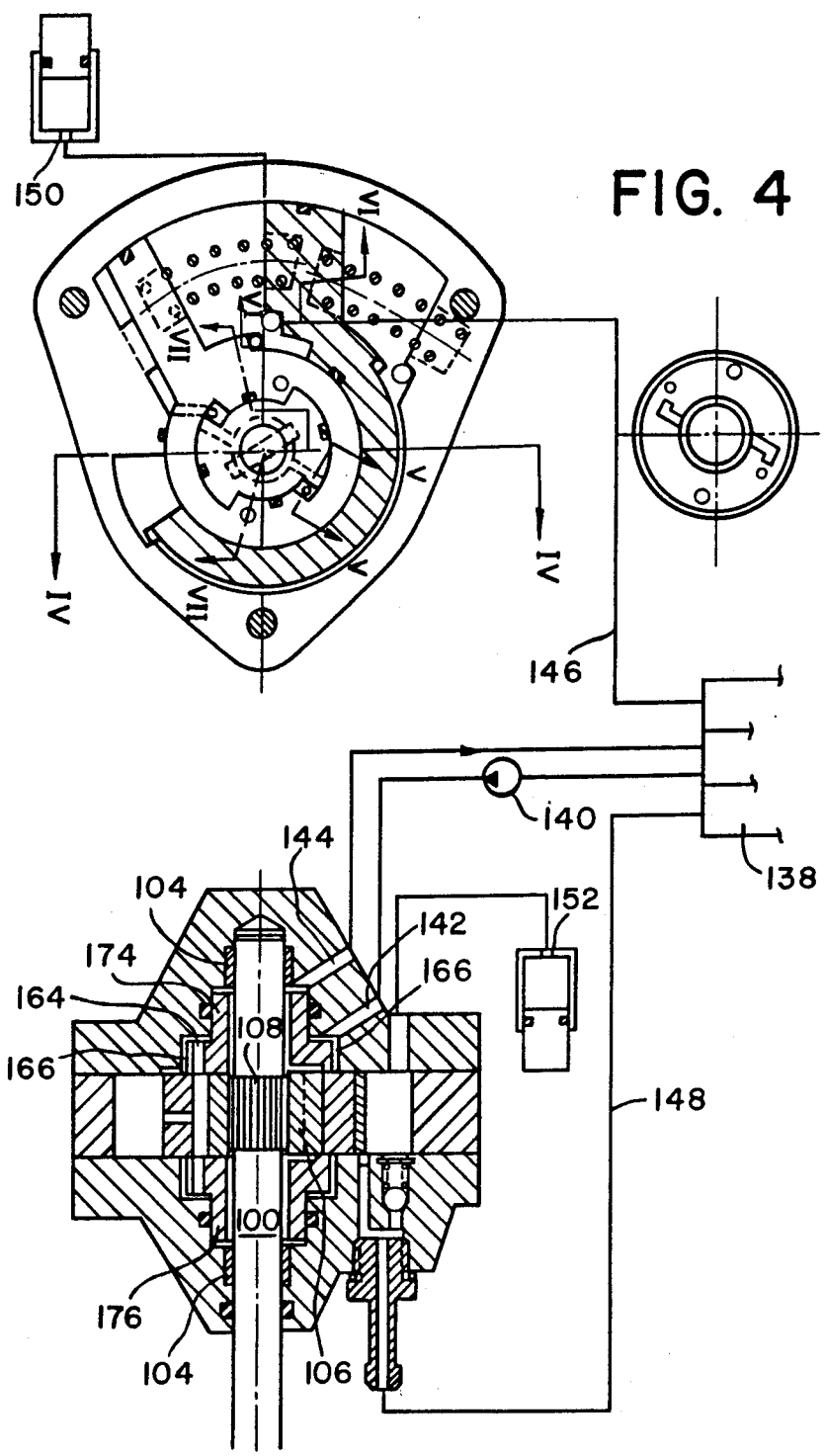
Figure 5:
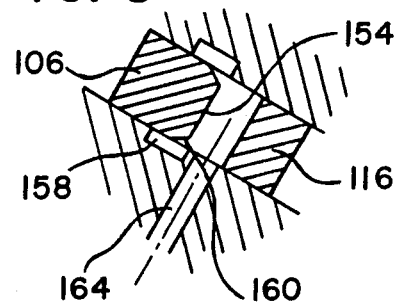
Figure 6:
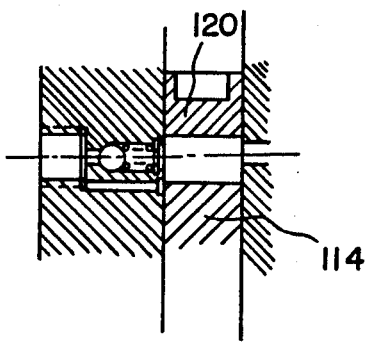

The present invention will now be described by way of example with reference to the accompanying drawings, in which:

FIG. 1 is a cross-section through a tandem master-cylinder according to a first embodiment of the invention, FIG. 2 is sectional view taken along the line II—II of FIG. 1, FIG. 3 is a cross-section through a second embodiment of tandem master-cylinder with hydraulic assistance, FIG. 4 is a combined view of the master-cylinder of FIG. 3 and includes a sectional view taken along the line IV—IV and a schematic layout of the hydraulic circuit with which the master-cylinder is used, FIG. 5 is a sectional view taken along the line V—V FIG. 4, FIG. 6 is a sectional view taken along the staggered line VI—VI in FIG. 4

Figure 7:
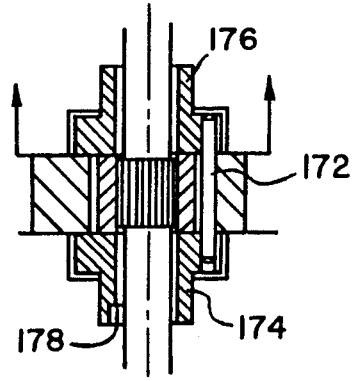

FIG. 7 is a sectional view taken along the staggered line VII—VII in FIG. 4.

As shown in FIGS. 1 and 2 a tandem rotary master-cylinder comprises a body 10 in which is rotatably mounted an input shaft 12 which is intended to be connected to a vehicle brake pedal (not shown) such that a depression of the brake pedal causes rotation of the input shaft 12. The input shaft 12 is rotatably mounted in bearings 14 and an annular seal 16 is provided to prevent the entry of contaminants into the body 10.

A generally arcuate pressure chamber 18 is formed in the body 10 and receives a first vane 20 fixedly mounted on the input shaft 12 by means of splines 22. The first vane 20 has a generally annular base 24 arranged around the input shaft and carries, at its distal end, an edge seal 26 which sweeps over the curved surface 28 of the pressure chamber 18. A second vane 30 is slideably arranged on the first vane 20 by means of a curved inner surface 32 which corresponds to, and extends around, the curved outer surface 34 of annular base 24. The second vane 30, as in the case of the first vane 20, has an edge seal 36 and, in addition, is sealed with respect to the first vane by an edge seal 38.

The first vane 20 is urged towards its illustrated rest position, in abutment against an end wall 40 of the pressure chamber 18, by a helical return spring 42 arranged around the input shaft 12. The second vane 30 is urged towards its illustrated rest position, where a projection 44 engages a shoulder 46 in the chamber 18, by a spring 48, one end of which is received in a recess 50 in the body 10 and the other in a recess 52 in the second vane 30. A primary pressure chamber 54 is defined between the first and second vanes 20, 30 and is connected to a primary braking circuit (not shown) by an outlet 56. The primary pressure chamber 54 is connected, in the rest position, to a low pressure reservoir (not shown) by an opening 58 arranged immediately adjacent the leading edge 60 of the first vane 20. Initial movement of the first vane 20 covers the opening 58 and isolates the pressure chamber 54 from the reservoir. A secondary pressure chamber 62 is defined between the second vane 30 and the body 10 and is connected to a secondary braking circuit (not shown) by an outlet 64. The secondary pressure chamber 62 also communicates with the low pressure reservoir, in the rest position, by way of an opening 66 similar to opening 58. A rear chamber 68, defined behind the first vane 20 also communicates with the low pressure reservoir by way of a passage 70.

When the rotary master-cylinder is to be operated the brake pedal is depressed causing the input shaft 12 to rotate and causing the first vane 20 to sweep out an arc of a circle, the edge seal 26 remaining in contact with the surface 28. Once the opening 58 has been closed by the first vane 20 the pressure in the primary pressure chamber 54 starts to increase. This increase in pressure causes the second vane 30 to rotate about the input shaft 12 and, once the opening 66 has been closed the pressure in the secondary pressure chamber 62 starts to increase also. As the displacement of the second vane 30 is a function of the pressure differential across it, the pressures in the two pressure chambers 54 and 62 will tend to equalize. If the actuation of the brake pedal continues the pressures in chambers 54 and 62 will continue to increase resulting in braking of the vehicle. Upon termination of braking the two vanes 20 and 30 return to their rest positions under the effect of springs 42 and 48 and the hydraulic pressures in the chambers 54 and 62. Once in the rest position the openings 58 and 68 are uncovered allowing fluid flow to or from the reservoir. In the event of a pressure failure in the primary braking circuit, when the device is operated the first vane 20 moves until it mechanically engages the rear of the second vane 30, the two vanes are then displaced together to pressurize the secondary braking circuit. In the event of a pressure failure of the secondary braking circuit the second vane 30 is displaced, upon operation of the device, into abutment with the wall of the body 10 while the primary circuit remains operational.

In FIG. 3 there is shown a second embodiment of tandem rotary master-cylinder which differs from that described above in that it is intended for use in conjunction with a source of high pressure fluid in order to provide assisted braking for the vehicle driver.

In this embodiment the input shaft 100 is rotatably mounted in the body 102 by means of bearings 104 and carries a valve member 106 fixedly mounted thereon by means of splines 108. The periphery of the valve member 106 is formed, in part, by two arcs 110 and 112. A first vane 114 has a generally annular base 116 which is arranged around the valve member 106, the shape of the inner surface 118 of the annular base 116 corresponding closely to that of the outer surface of the valve member 106 so that the first vane 114 is rotatably mounted and guided in the body 102 by the valve member 106. A second vane 120 is rotatably mounted around the first vane 114 is a manner analogous to that of the first embodiment. In a similar way the device includes return springs 122 and 124, primary and secondary pressure chambers 126 and 128, reservoir return openings 130 and 132 and primary and secondary braking circuit outlets 134 and 136 all of which are similar in function to those of the previous embodiment.

Turning now to FIG. 4 the hydraulic circuit associated with the present invention comprises a hydraulic low pressure reservoir 138 from which fluid is drawn by a pump 140 and sent under pressure to an inlet 142 in the body 102. In the rest position of the device fluid flows freely through the interior, by a pathway that will be described below, and returns to the reservoir 138 by way of outlet 144. The reservoir return openings 130 and 132 are connected to the reservoir 138 by pipes 146 and 148 respectively. Outlets 134 and 136 are connected to primary and secondary brake circuits 150 and 152 respectively.

The valve member 106 has two similar leading edges 154 and 156 which, in the illustrated rest position, are arranged adjacent to openings 158 (see FIG. 5) which are in fluid communication with the outlet 144 to the reservoir 138. As shown in FIG. 5 each leading edge 154 of the valve member 106 is formed with chamfered surfaces 160 which extend across the openings 158 such that a displacement of the valve member 106 will progressively close the openings 158 and isolate the reservoir 138 from the high pressure pump 140. The openings 158 are in fluid communication with each other by way of a generally annular passage 162 formed in the body 102 and shown by a dotted line in FIG. 3. A high pressure opening 164 is arranged adjacent to one of the openings 158 and communicates with the high pressure inlet 142 by way of passages 166. The high pressure opening 164 communicates with an actuator chamber 168, defined between the first vane 114 and the body 102, by way of a passage 170. In the rest position fluid from the pump 140 is recycled directly to the reservoir 138 and thus the pressure in actuator chamber 168 is not sufficient to overcome the force of the return springs 122 and 124 and displace the first vane 114. As shown in FIG. 7 the first vane 114 is mounted by way of connecting pins 172 on two hubs 174 and 176 which are rotatably mounted in the body 102. A centering spring 178 is arranged between the input shaft 100 and the hub 174.

The device as described above operates as follows. In the illustrated rest position fluid under pressure from the pump 140 passes from inlet 142 to the outlet 144 and back to the reservoir 138 by way of passages 166, high pressure opening 164 and openings 158. The pressure exerted in the actuator chamber is not sufficient to overcome the combined effect of return springs 122 and 124. When the vehicle driver presses the brake pedal the input shaft 100 is rotated causing the valve member 106 to turn relative to the first vane 114. The valve member 106 moves over and closes the reservoir return openings 158, the closure being progressive due to the chamfered edges 160. The high pressure fluid from the pump 140 is thus isolated from the reservoir 138 and the pressure in actuator chamber 168 rises accordingly causing the first vane 114 to rotate in the body 102. As in the case of the first embodiment, once the opening 130 has been closed by the first vane 114 the pressure in the primary chamber 126 rises causing the second vane 120 to rotate, closing in turn the opening 132. The pressures in the primary and secondary chambers 126 and 128 increase causing braking of the vehicle. As in the prior embodiment the pressures in the two chambers remain substantially equal due to the freedom of movement of the second vane 120.

Upon release of braking the input shaft 100 and the valve member 106 tend to return in an anti-clockwise direction (when viewing FIG. 3). The valve member 106 uncovers the openings 158 allowing the fluid under pressure from the actuator chamber 168 and from the pump 140 to return to the reservoir 138. The pressure in actuator chamber 168 therefore falls allowing the two vanes 114 and 120 to return towards their rest position.

Should the brake pedal be held at a given position, intending to give a constant braking force, the valve member 106 will remain in a fixed position relative to the body 102. The vane 114 and its associated hubs 174 and 176 will tend to oscillate fractionally relative to the first vane with the openings 158 being closed and then opened repeatedly to a small degree producing a modulation of the pressure applied to the actuator chamber. The braking force will thus remain constant.

In the event of a high pressure failure the device will operate in a way similar to that of the first embodiment with the valve member 106 mechanically engaging shoulders 180 on the first vane 114 so as to form a direct mechanical link between the input shaft 100 and the first vane 114.

I claim:

1. Rotary master-cylinder comprising a body (10;102) in which a first vane (20;114) is mounted for rotation in response to rotation of an input shaft (12;100) in order to generate pressure in a first working chamber (18;126) formed in the body (10;102) and delimited in part by the first vane (20;114), characterized in that the master-cylinder further comprises a second vane (30;120) rotatably mounted in the body (10;102) and delimiting with the first vane (20;114) the first working chamber (18;126), the second vane being rotatable in response to rotation of the first vane (20;114) to generate pressure in a second working chamber (62;128).

2. Master-cylinder as claimed in claim 1, characterized in that the first vane (20) is fixedly mounted on the input shaft (12).

3. Master-cylinder as claimed in claim 2, characterized in that the second vane (30) is rotatably mounted on the first vane (20).

4. Master-cylinder as claimed in claim 3, characterized in that the first vane (20) has a generally annular base (24) mounted on the input shaft (12), the second vane (30) having a generally semi-circular part arranged around the annular base (24) so as to allow relative rotation between the first and second vanes (20;30).

5. Master-cylinder as claimed in claim 1, characterized in that it further comprises valve means (106) adapted to be disposed between a source of fluid under pressure and an actuator chamber (168) formed in the body (102) and delimited in part by the first vane (114), the valve means (106) being operable in response to rotation of the input shaft (100) so as to send fluid under pressure into the actuator chamber (168) and cause displacement of the first vane (114).

6. Master-cylinder as claimed in claim 5, characterized in that, in operation, the actuator chamber (168) is in fluid communication with the source of fluid under pressure and a low pressure reservoir, operation of the valve means (106) isolating the actuator chamber (168) from the low pressure reservoir.

7. Master-cylinder as claimed in claim 6, characterized in that the first vane (114) has a generally annular base (116) the valve means (106) being arranged within said annular base (116), the first vane (114) and the valve means (106) having coextending surfaces (110;118) serving to rotatably guide the valve means (106) and the first vane (114), one relative to the other.

8. Master-cylinder as claimed in claim 7, characterized in that the second vane (120) has a generally semi-circular part arranged around the annular base (116) so as to allow relative rotation between the first and second vanes (114;120).

9. Master-cylinder as claimed in claim 6 characterized in that the valve means (106) is formed with a chamfered surface (160) adapted, upon rotation of the valve means (106), to progressively close a fluid passage (158) between the actuator chamber (168) and the low pressure reservoir.

10. Master-cylinder as claimed in claim 5 characterized in that the first vane (114) and the valve means (106) are mutually engageable to allow rotation of the first vane (114) by the valve means (106).

* * * * *